United States Patent [19]

Luchinger et al.

[11] 4,134,468

[45] Jan. 16, 1979

[54] ELECTROMAGNETIC SCALE WITH DECREASED TEMPERATURE VARIATION

[75] Inventors: Paul Luchinger, Greifensee; Enrico Realini, Uster, both of Switzerland

[73] Assignee: Mettler Instrumente AG, Schweiz, Switzerland

[21] Appl. No.: 874,895

[22] Filed: Feb. 3, 1978

[30] Foreign Application Priority Data

Jun. 15, 1977 [CH] Switzerland .................. 7350/77

[51] Int. Cl.² ............................................. G01G 3/14
[52] U.S. Cl. ............................................. 177/210 EM
[58] Field of Search .................. 177/210 EM, 212

[56] References Cited
U.S. PATENT DOCUMENTS

| | | | |
|---|---|---|---|
| 3,182,495 | 5/1965 | Johnson | 177/210 EM X |
| 3,618,685 | 11/1971 | Fiet | 177/210 EM |
| 3,656,569 | 4/1972 | Johnson | 177/210 EM |
| 3,685,604 | 8/1972 | Smith et al. | 177/210 EM X |
| 3,688,854 | 9/1972 | Strobel | 177/210 EM X |
| 3,955,638 | 5/1976 | Wasko | 177/212 |

*Primary Examiner*—George H. Miller, Jr.
*Attorney, Agent, or Firm*—Marianne Rich

[57] ABSTRACT

Undesired temperature variations in scales having a force-compensating coil carrying a load dependent current are reduced by an additional heat generator mounted near the coil. The heat generated by the latter is controlled to compensate for changes in heating power dissipated by the force-compensating coil.

13 Claims, 6 Drawing Figures

ELECTROMAGNETIC SCALE WITH DECREASED TEMPERATURE VARIATION

BACKGROUND OF THE INVENTION

This invention relates to electromagnetic scales having a permanent magnet system with an air gap and a coil arranged within the air gap through which flows a compensating current which varies as a function of the load being weighed.

It is a disadvantage of these known scales, that the heat generated by the compensating current flowing through the coil varies as a function of the load. Thus, the heat generated by the current through the coil will vary during sequential weighing of different loads. The heat generated by the current in the coil is of course proportional to the square of the current. The temperature within the scale thus changes continually, causing an instability in the zero point and possibly in the sensitivity of the scale. For example, for scales wherein the pan and the bending sections of the suspension are arranged in parallel, temperature changes result in changes in the mechanical tension and in differences in expansion, which in turn result in errors in the path along which the pan is to move. These effects are particularly annoying in very compact scales with high resolution. If these scales have a lever transmission, temperature differences at the lever can influence the sensitivity. These temperature change effects on the permanent magnet system can be reduced by means of correspondingly placed temperature sensors, but residual temperature errors caused by the heat inertia of the magnet system will remain.

SUMMARY OF THE INVENTION

It is an object of the present invention to reduce the above-described undesired temperature effects.

The present invention relates to a scale having main coil means for carrying a first current varying as a function of the load being weighed. The heating power generated by said main coil means therefore varies as a function of said load causing corresponding load-dependent temperature changes. In such a scale, additional heat generating means is arranged near said main coil means; and control means are connected to said additional heat generating means for controlling the heating power generated by said additional heat generating means in such a manner that said load-dependent temperature changes are substantially decreased.

The present invention encompasses many different embodiments, depending upon the type of scale and its construction. In a first preferred embodiment, the main coil means comprises a force-compensating coil arranged on a coil form. The scale is an electromagnetic scale wherein the current through the coil is varied by pulse width modulation. The current source is a constant current source. In this preferred embodiment the power transistor at the output of the constant current source is mounted on the coil form, since the power dissipated therein varies substantially inversely as the power dissipated in the main coil.

In other preferred embodiments, a second bifilar winding is arranged in the vicinity of the main coil.

In another preferred embodiment, a semiconductor resistor is mounted near or on the axis of symmetry of the coil form.

The present invention, both as to its construction and its method of operation, together with additional objects and advantages thereof, will best be understood from the following description of preferred embodiments when read in connection with the accompanying drawing.

DESCRIPTION OF THE PREFERRED EMBODIMENT

Figure 1:
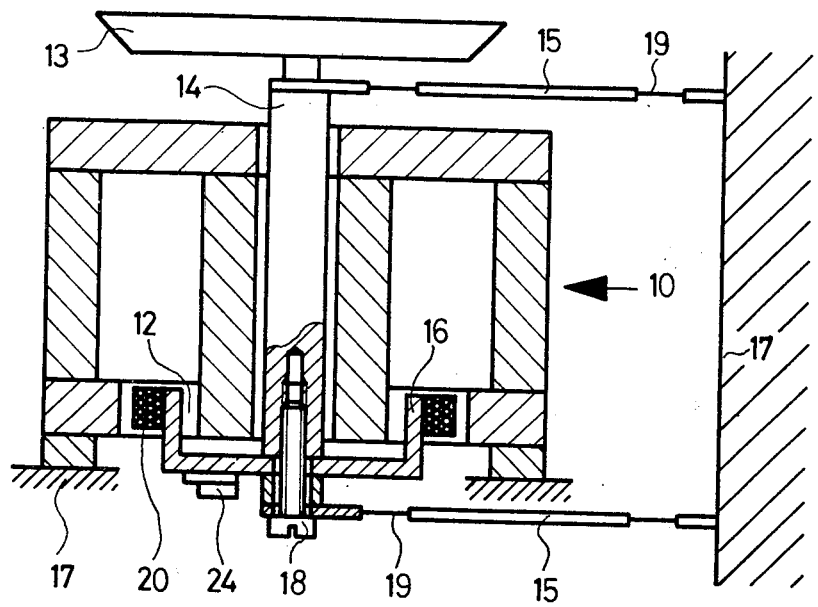
FIG. 1 is a typical embodiment of a scale with a permanent magnet system and coil form.
Figure 2:
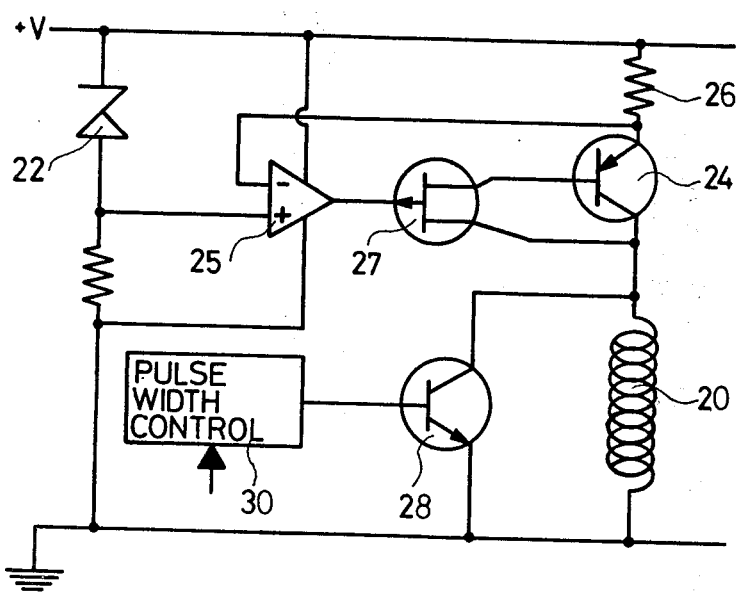
FIG. 2 is a schematic diagram of the electrical circuits associated with the scale of FIG. 1.

The first embodiment of the present invention is illustrated in FIGS. 1 and 2. This embodiment is suitable for a scale wherein the current in the main coil is derived from a constant current source and the variation of current with load is accomplished by pulse width modulation. In such a scale, which, for example is described in U.S. Pat. No. 3,786,884, clock pulses are transmitted to a counter throughout the pulse width and the number counted over a predetermined time interval is transferred to a digital display which indicates the weight.

In FIG. 1, a pot-shaped magnet 10 has an annular air gap 12. A cylindrical supporting member 14 passes through the center of the iron core. An aluminum coil form 16 is fastened by a screw 18 to the lower end of supporting member 14. The force-compensating coil 20 is mounted on coil form 16. A pan 13 is mounted at the upper end of supporting member 14. The free ends of triangular restraints 15 and 15' are clamped between the supporting member 14 and pan 13 and between supporting member 14 and coil form 16 respectively. The other ends of the two restraints are mounted on frame 17. Each restraint 15 includes three bending sections 19, one each at the end near supporting member 14 and two each near frame 17. It will readily be noted that the bending sections 19 which are near the supporting member (and especially the lower one) are located very close to the magnet system 10 and to air gap 12 and will therefore be strongly affected by the temperature within the air gap.

FIG. 2 shows the part of the electrical circuit associated with the scale shown in FIG. 1 which is relevant to the present invention. A constant current source includes a Zener diode 22 which serves to provide a reference voltage. The reference voltage is applied to the direct input of a difference amplifier 25, whose inverting input receives the voltage across a resistor 26. The output of operational amplifier 25 is applied to the base of a field effect transistor 27, whose main electrodes are connected from the base to the collector of a power transistor 24. The emitter of transistor 24 is connected to the end of resistor 26 which is also connected to the inverting input of operational amplifier 25. The emitter-collector circuit of power transistor 24 is connected in series with coil 20 which is the force-compensating coil of the scale. The above circuitry constitutes a constant current source connected in series with coil 20, since the current through power transistor 24 is automatically adjusted until the voltage drop across resistor 26 is the same as the reference voltage. A shunting circuit includes a transistor 28 whose emitter-collector circuit is connected in parallel with coil 20. Transistor 28 is switched to a conductive state, short-circuiting coil 20, under control of a circuit 30 which is known prior art and regulates the pulse width in accordance with the weight of the applied load.

In accordance with the present invention, transistor 24 is mounted on the coil form. A mica washer is used for electrical insulation and good heat conductivity. The following considerations will show that the power dissipated by transistor 24 and coil 20 remains constant, independent of load. The current through transistor 24 and therefore through resistor 26 remains constant. When switch 28 is conductive, the voltage across transistor 24 is equal to the supply voltage minus the drop across resistor 26. When switch 28 is open, the same current flows through transistor 24 and coil 20, and the voltage drop across the series combination of transistor 24 and coil 20 is the same as previously appeared across transistor 24. Since power equals voltage times current, the power loss in the system remains constant, independent of load. The error in temperature which results from the fact that transistor 24 is at a small distance from air gap 12 is relatively small.

The above-described arrangement resulted in a decrease of temperature drift as a function of load of the zero point by 70% in otherwise indentical scales.

Figure 3:
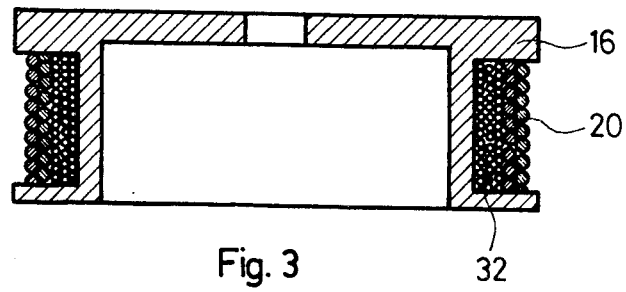
FIG. 3 shows a coil form with an additional coil.
Figure 4:
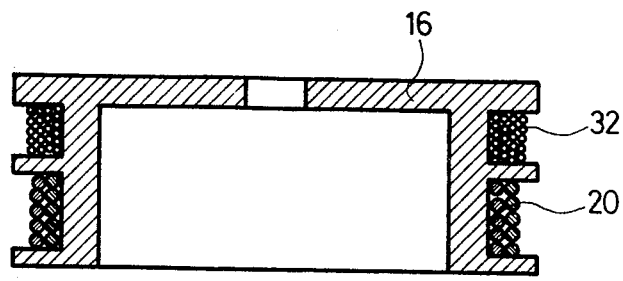
FIG. 4 is a variation of the arrangement of FIG. 3.

A second embodiment of the present invention will be discussed with reference to FIGS. 3, 4 and 5. In this embodiment the scale operates with analogue compensation, that is the force-compensating current is a direct current having an amplitude which varies as a function of the applied load. The display is still a digital display, a digital voltmeter being utilized to indicate the voltage across a resistor carrying the compensation current.

In accordance with the present invention, an additional coil 32 wound as a bifilar winding is used. The additional coil 32 may be wound within the main coil 20 as shown in FIG. 3, or in a separate groove in the coil from as shown in FIG. 4. The arrangement of FIG. 3 has the advantage of symmetry and of least additional cost, does, however, require an increase in the air gap volume. In the embodiment of FIG. 4, the air gap is utilized optimally, but the length of the coil form in the axial direction must be increased.

Figure 5:
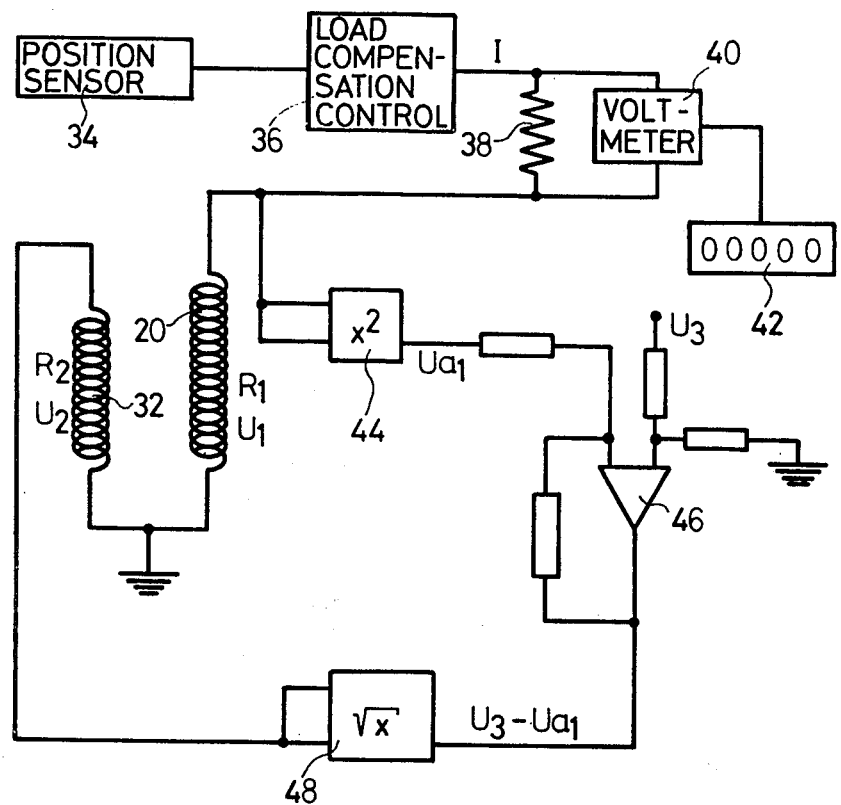
FIG. 5 is a circuit diagram of the electrical circuitry associated with FIGS. 3 and 4.

FIG. 5 is the circuit diagram of the required electrical circuitry. As known in the prior art, a position sensor 34 is provided, as is a compensation control circuit 36 which includes the required amplifier, constant current source and regulator. The compensation current flows through a resistor 38. The voltage drop across resistor 38 is sensed by a digital voltmeter 40 whose output is a digital display 42. The weight applied to the scale is indicated in the proper units in display 42.

In order to keep the heating power in air gap 12 independent of load, the sum of the power dissipated in the two coils (20 and 32) must be constant, that is:

$$P = \text{constant} = \frac{V_1^2}{R_1} + \frac{V_2^2}{R_2}$$

Here $V_1$ is the voltage drop across coil 20 and $V_2$ that across coil 32. If the resistance of the two coils is equal, $$P = \frac{1}{R}(V_1^2 + V_2^2); \text{ therefore,}$$

$V_2$ equal the square root of $P \cdot R - V_1^2$.

In order to fulfull these requirements, the voltage $V_1$ is applied to the two inputs of a multiplier 44. The voltage at the output of multiplier 44 (second voltage) is therefore equal to $V_1^2$. This voltage is applied to input of a difference amplifier 46 to whose other input is applied a reference voltage $V_3$. A difference amplifier output signal is therefore equal to $V_3 - V1^2$. This signal is applied to the input of a square root extracting circuit. The analog voltage at the output of analog square root extracting circuit is the voltage $V_2$ which must be applied to coil 32 in order to keep the sum of the two dissipated powers constant.

With proper modification, this embodiment can also be utilized in scales having pulse width modulation as described with reference to FIGS. 1 and 2.

The amount of control circuitry shown in FIG. 5 can be considerably reduced if, instead of keeping the heating power dissipated by the two coils constant over the full load range, only the sum of the currents flowing through coils 20 and 32 is kept constant. In this case, the heating power dissipated at no load and full load will be the same, while the minimum heat dissipation which will occur at half load, will be 50 percent of the maximum heating power. If it is considered that without the additional coil the heating power generated at no load is zero and at half load only 25 percent of the maximum heat dissipation, it will be obvious that a marked improvement occurs even if only the sum of the currents in the two coils is kept constant.

A further preferred embodiment of the present invention is a variation of the arrangment shown in FIGS. 1 and 2. An additional coil, such as coil 32 of FIG. 5, is connected between the emitter of power transistor 28 and ground potential. This coil constitutes the additional heat generating means. The current furnished by the constant current source thus alternately flows through coil 20 and the above-mentioned coil. Maximum heat dissipation will occur at zero load and at full load, while the minimum heat dissipation will be 75 percent of the maximum heat dissipation. This will occur at half load. This embodiment has the advantage relative to the embodiment described above with reference to FIGS. 1 and 2 that the maximum dissipation corresponds only to the heating power in coil 20 at full load. A maximum heat dissipation when transistor 24 is utilized as the additional heat generator means is considerably higher.

Figure 6:
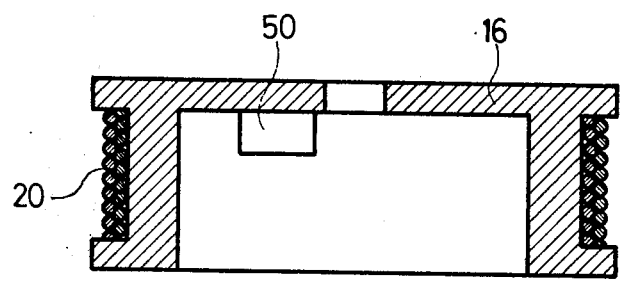
FIG. 6 is a further embodiment of the coil form.

A further embodiment is shown in FIG. 6. Here, instead of an additional coil, a semiconductor resistor 50 is used which is mounted on coil form 16 near the axis of the supporting member 14. This embodiment is particularly inexpensive and the symmetry of the arrangement is maintained adequately. Since of course it is the temperature in the air gap which is the important criterion, the coil form must be a good heat conductor. The electrical circuit is similar to that shown in FIG. 5. The only difference would be that coil 32 is replaced by a resistor.

Further embodiments of the invention will readily come to mind. For example, the maximum heat dissipated in the main coil could be calculated. A digital complement of the digital weight indicated by the scale is formed, this digital complement is applied to an digital-analogue converter and the resulting analog voltage is applied to cause a heating current to flow through an additional coil as shown in FIG. 3 or 4, or an additional resistor as shown in FIG. 6.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a scale having main coil means for carrying a first current varying as a function of the load being weighed, whereby the heating power generated by said main coil means varies as a function of said load causing loaddependent temperature changes: additional heat generating means arranged near said main coil means; and control means connected to said additional heat generating means, for controlling the heating power generated by said additional heat generating means in such a manner that the sum of the heating powers generated by said main coil means and said additional heat generating means is substantially the same at a first and second predetermined value of said load, said first and second predetermined value being substantially equal, respectively, to the no load and full load value of said load.

2. Apparatus as set forth in claim 1, wherein said scale comprises a constant current source having a power transistor connected in series with said main coil means, and shunting means connected in parallel with said coil for cyclically shunting current away from said coil for load-varying time intervals; wherein said power transistor is mounted near said coil and constitutes said additional heat generating means; and wherein said constant current source constitutes said control means.

3. Apparatus as set forth in claim 1, wherein said first and second predetermined value of said load are the no load and full load values respectively.

4. Apparatus as set forth in claim 3, wherein said main coil means is a force-compensating coil; wherein said scale further comprises a coil form carrying said force-compensating coil; and wherein said additional coil is wound on said coil form within said force-compensating coil.

5. Apparatus as set forth in claim 1, wherein said additional heat generating means comprises an additional coil; and wherein said control means comprises means for controlling the current through said additional coil.

6. Apparatus as set forth in claim 5, wherein said additional coil is a bifilar winding.

7. Apparatus as set forth in claim 6, wherein said scale further comprises a coil form having a first groove for carrying main coil means and a second groove for carrying said additional coil.

8. Apparatus as set forth in claim 1, wherein said additional heat generating means comprises an element having electrical resistance; wherein said scale further comprises means for furnishing a first voltage having an amplitude corresponding to the amplitude of said first current; and wherein said control means comprises means interconnected between said first voltage furnishing means and said element, for applying a control voltage to said element, said control voltage having an amplitude varying as a predetermined function of said first voltage.

9. Apparatus as set forth in claim 8 wherein said control means comprises squaring circuit means connected to said means for furnishing a first voltage, for furnishing a second voltage having an amplitude equal to the square of the amplitude of said first voltage, means for furnishing a reference voltage, difference amplifier means connected to said squaring circuit means and said means for furnishing a reference voltage, for furnishing a difference amplifier output signal having an amplitude corresponding to the difference in amplitude between said reference voltage and said second voltage, and square root extracting means interconnected between said difference amplifier means and said element, for furnishing said control voltage to said element in response to said difference amplifier output signal.

10. Apparatus as set forth in claim 8, wherein said element comprises an additional coil.

11. Apparatus as set forth in claim 8, wherein said element is a semiconductor resistor.

12. Apparatus as set forth in claim 8, wherein:
$$V_2^2 = K - V_1^2$$

where $V_2$ = the voltage applied to said element
$K$ is a constant and
$V_1$ is said first voltage.

13. Apparatus as set forth in claim 12, wherein said main coil means has an electrical resistance; wherein said element has an electrical resistance substantially equal to said electrical resistance of said main coil means; and wherein:

$$K = P \cdot R.$$

where $P$ = sum of heating power generated by said main coil means and said element, and
$R$ = resistance of said element.

* * * * *